(12) United States Patent
Cheng et al.

(10) Patent No.: US 7,031,967 B2
(45) Date of Patent: Apr. 18, 2006

(54) METHOD AND SYSTEM FOR IMPLEMENTING POLICIES, RESOURCES AND PRIVILEGES FOR USING SERVICES IN LDAP

(75) Inventors: Qingwen Cheng, Fremont, CA (US); Heng-Ming Hsu, Sunnyvale, CA (US); Rajesh Kumar Arcot, Sunnyvale, CA (US); James F. Nelson, Danville, CA (US); Sai V. Allavarpu, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 313 days.

(21) Appl. No.: 10/118,885

(22) Filed: Apr. 8, 2002

(65) Prior Publication Data

Related U.S. Application Data

(60) Provisional application No. 60/310,528, filed on Aug. 6, 2001.

(51) Int. Cl.
*G06F 17/30* (2006.01)
(52) U.S. Cl. .............. 707/10; 707/1; 707/9; 707/102; 709/229
(58) Field of Classification Search .............. 707/1–10; 709/100–102, 204, 223–224, 229; 713/201
See application file for complete search history.

(56) References Cited

U.S. PATENT DOCUMENTS

| 6,366,913 | B1* | 4/2002 | Fitler et al. | 707/9 |
|---|---|---|---|---|
| 6,490,619 | B1* | 12/2002 | Byrne et al. | 709/223 |
| 6,768,988 | B1* | 7/2004 | Boreham et al. | 707/3 |
| 6,785,686 | B1* | 8/2004 | Boreham et al. | 707/102 |
| 6,836,794 | B1* | 12/2004 | Lucovsky et al. | 709/223 |
| 2002/0107859 | A1* | 8/2002 | Tsuyuki | 707/100 |
| 2002/0129135 | A1* | 9/2002 | Delany et al. | 709/223 |
| 2002/0147801 | A1* | 10/2002 | Gullotta et al. | 709/223 |
| 2003/0037052 | A1* | 2/2003 | Kitain et al. | 707/10 |
| 2003/0131113 | A1* | 7/2003 | Reeves et al. | 709/229 |

* cited by examiner

*Primary Examiner*—Debbie M. Le
(74) *Attorney, Agent, or Firm*—Osha Liang LLP

(57) ABSTRACT

A system for providing service attribute information including a directory server containing a hierarchical data store associating users with service attributes through data inheritance, wherein the hierarchical data store includes an organization level and a role level, and attribute templates defined with respect to services and levels, an application for generating a query to the directory server for a service attribute of a particular user of the application, wherein the directory server, in response to the query, is for using inheritance rules from the hierarchical data store to determine and report a service attribute for the particular user of the application.

17 Claims, 14 Drawing Sheets

100

| CLASS OF SERVICE 99 | COST 101 | STORAGE 102 | WEB-MAIL 103 | CALENDAR 104 |
|---|---|---|---|---|
| PREMIUM 105 | $30/MO | 30 MB | YES | YES |
| DELUXE 106 | $20/MO | 20 MB | YES | YES |
| PROMOTIONAL 107 | $15/MO | 10 MB | YES | NO |
| BASIC 108 | NONE | 5 MB | YES | NO |

| CLASS OF SERVICE SERVICE 99 | ORGANIZATION 1 250 | ORGANIZATION 2 270 |
|---|---|---|
| PREMIUM 105 | X | |
| DELUXE 106 | | X |
| PROMOTIONAL 107 | | |
| BASIC 108 | | |

| CLASS OF SERVICE SERVICE FOR ORGANIZATION 1 99 | ROLE 1 24 | ROLE 2 25 |
|---|---|---|
| PREMIUM 105 | | X |
| DELUXE 106 | X | |
| PROMOTIONAL 107 | | |
| BASIC 108 | | |

| CLASS OF SERVICE SERVICE FOR ORGANIZATION 2 99 | ROLE 1 251 | ROLE 3 271 |
|---|---|---|
| PREMIUM 105 | | |
| DELUXE 106 | X | |
| PROMOTIONAL 107 | | |
| BASIC 108 | | X |

METHOD AND SYSTEM FOR IMPLEMENTING POLICIES, RESOURCES AND PRIVILEGES FOR USING SERVICES IN LDAP

This application, identified by application Ser. No. 10/118,885, claims benefit to Provisional Application Ser. No. 60/310,528 filed on Aug. 6, 2001, entitled "Modeling Policy/Service Templates For Roles and Organizations in LDA," by inventors Qingwen Cheng, et al., under 35 U.S.C. § 119(e).

FIELD OF THE INVENTION

The field of the invention relates to the field of data processing. More specifically, embodiments of the present invention relate to assigning service templates to particular roles and organizations in LDAP.

PRIOR ART

Computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of computer hardware higher, more sophisticated computer software has evolved to take advantage of the higher performance of the hardware, resulting in computer systems today that are much more powerful than just a few years ago.

Other changes in technology have also profoundly affected how people use computers. For example, the widespread proliferation of computers prompted the development of computer networks that allow computers to communicate with each other. With the introduction of the personal computer (PC), computing became accessible to large numbers of people. Networks for personal computers were developed to allow individual users/applications to communicate with each other and also to obtain information/data from data repositories. In recent times, Light Weight Directory Access Protocol (LDAP) has become very popular because of its efficient and fast data access. Large number of applications/services are currently being developed which use Directory as their centralized data repository. A single Directory could potentially serve as a Centralized Data repository for numerous applications. Each application/service inturn would store its user specific information in the Directory.

The information in the directory itself is stored as an information tree and is usually referred to as a Directory Information Tree (DIT). Some of the use specific information stored by applications/services could be dependent on the organization or domain of the user. Hence, to avoid redundancy applications store them at the organization or domain nodes in the Directory. As a result of sharing organization/domain specific information with numerous users, several directory calls must be made to retrieve service attributes of a user specific to the application. This process would typically involve searching the DIT to obtain the requested information and could have considerable overhead on the network.

Referring to Prior Art FIG. 1, a simplified block diagram illustrating the complications involved in tree walking. As described above, the tree walking process begins when an application 204 makes a directory call to retrieve attributes for a particular user. Initially, the directory 201 specifies the node from where the search should start from in the directory in order to obtain the application/service specific user's attributes. As the process continues, the application finally retrieves the specific attributes for a particular user. As the tree structures become more complex to accommodate more users and a larger variety of applications, the three walking process becomes more involved and becomes a hindrance on the performance of the directory server and the application.

SUMMARY OF THE INVENTION

What is needed is an efficient method for retrieving user attributes for particular applications on a network without flooding the network with numerous directory calls. A method for retrieving user attributes without intensive directory searches and tree walking would reduce congestion on a network by reducing the number of directory calls needed to gather user specific attributes.

Accordingly, the present invention implements policies for resources and privileges for using services by incorporating the use of iPlanet Directory Server's (iDS) Class of Service (CoS) feature developed by Sun Microsystems, Inc. Mountain view, Calif. The Class of Service (CoS) feature simplifies managing entries in a directory and reduces storage requirements by sharing attributes between entries in a way that is transparent to applications.

The CoS feature allows every organization entry in a directory to have multiple registered services. Once a service is registered, a CoS definition (service definition) can be created for that service under the organization entry. Once a service gets activated, an associated CoS template (service template) can be created for that service using its service definition. The template entries contain a list of shared attribute values and changes to these values get automatically applied to all the entries sharing the attribute. By creating these service definitions and templates under an organization entry, all the service privileges can be made available to all entries under the organization. Similarly, policies for resources can be defined for an organization and policy specific attributes can be made applicable to all the entries in the organization.

By using roles in combination with the Class of Service feature, different types of users can be provided with different privileges and different policy attributes. CoS templates that are based on roles can be used to create service templates and policy templates for different groups of users in the directory. Roles that are based CoS templates provide means to generate shared attribute values based on the role possessed by an entry. By adding users to roles, service privileges and policies can be applied to the added users.

All the service privileges and policy attributes for an entry get inherited from the parent organization. To address the particular needs of an individual sub-organization, additional service/policy templates can be created under them. Creating service/policy templates under multiple levels can provide flexibility in setting service privileges and policies. Conflicts arising as a result of more than one privilege/policy becoming applicable to a single user can be resolved by defining priorities for each template.

An embodiment of the present invention is directed to the application of the CoS feature in an LDAP directory server. The CoS feature allows user entries in a directory to be associated to service templates for multiple registered services in the LDAP directory. In one embodiment, once a service is registered, a CoS definition (service definition) can be created for that service under the organization entry. In another embodiment, once a service gets activated, an associated CoS template (service template) can be created for that service using its service definition. The template entries contain a list of shared attribute values and changes to these values get automatically applied to all the entries sharing the attribute. By creating these service definitions and templates under an organization entry, all the service privileges can be made available to all entries under the organization. Similarly, policies for resources can be defined for an organization and policy specific attributes can be made applicable to all the entries in the organization. By applying CoS to roles and organizations to implement privileges for services and policies for resources, a solution with simplifies managing entries in the directories is provided. As a result, there are reduced storage requirements as well as greater flexibility and scalability of a directory server.

More specifically, an embodiment of the present invention is directed to a system for providing service attribute information comprising a directory server comprising a hierarchical data store associating users with service attributes through data inheritance, the hierarchical data store comprising an organization level and a role level and further comprising attribute templates defined with respect to services and levels an application for generating a query to the directory server for a service attribute of a particular user for the application; and wherein the directory server, in response to the query, is for using inheritance rules from the hierarchical data store to determine and report a service attribute for the particular user for the application.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 5 is an example of service templates for four classes of service and four different services.

FIG. 7 is an example of a service template for assigning two different service levels to two different organizations.

FIG. 9 is an example of service templates for two different roles in organization one.

FIG. 10 is an example of service templates for two different roles in organization two.

DETAILED DESCRIPTION OF THE INVENTION

In the following detailed description of the present invention, a method and system for implementing policies, resources, and privileges for using services in LDAP, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions (e.g., process 700) that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
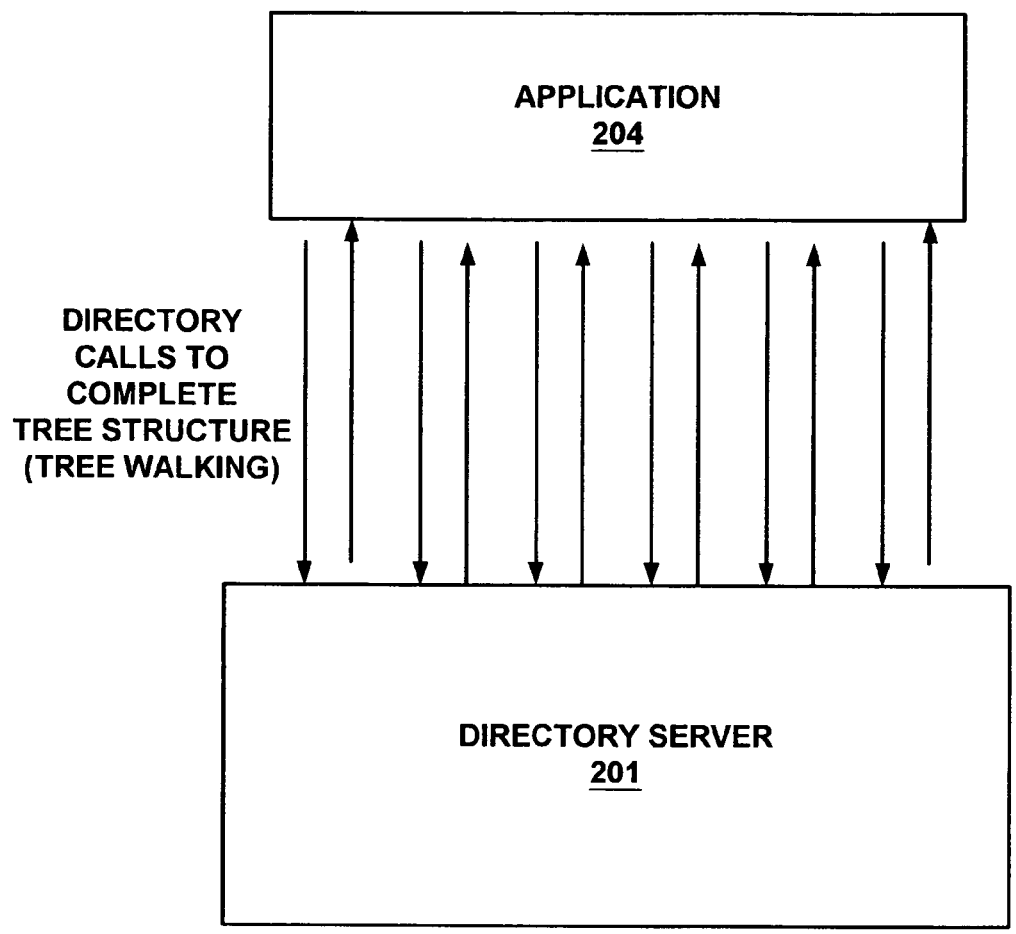
FIG. 1 is a prior art system illustrating the numerous directory calls each of them involving a searching the nodes of the directory.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "posting", "opening", "sending", "monitoring", "examining" or the like, refer to the action and processes of a computer system (e.g., Prior Art FIG. 1, and FIG. 6), or similar electronic computing device, that manipulates and transforms data represented as physical (electronic) quantities within the computer system's registers and memory into other data similarly represented as physical quantities within the computer system memory, registers, or other such information storage, transmission or display devices.

A Method and System for Implementing Policies, Resources, and Privileges for using Services in LDAP Class of service (CoS) is a feature of a Directory Server that enables management of a group of service related attributes. These related attributes form a category or Class of Service. Once attributes have been defined, and new classes have been created in the directory, a Class of Service can be assigned to individual user entries. The benefit of assigning a class of service to a user entry is the elimination of having to store multiple service related attributes in each user entry in the directory. In addition, changes made to a class of service can be accomplished simply by changing the entry in the class of service template rather than changing the attribute in each user entry in the directory.

Figure 2:
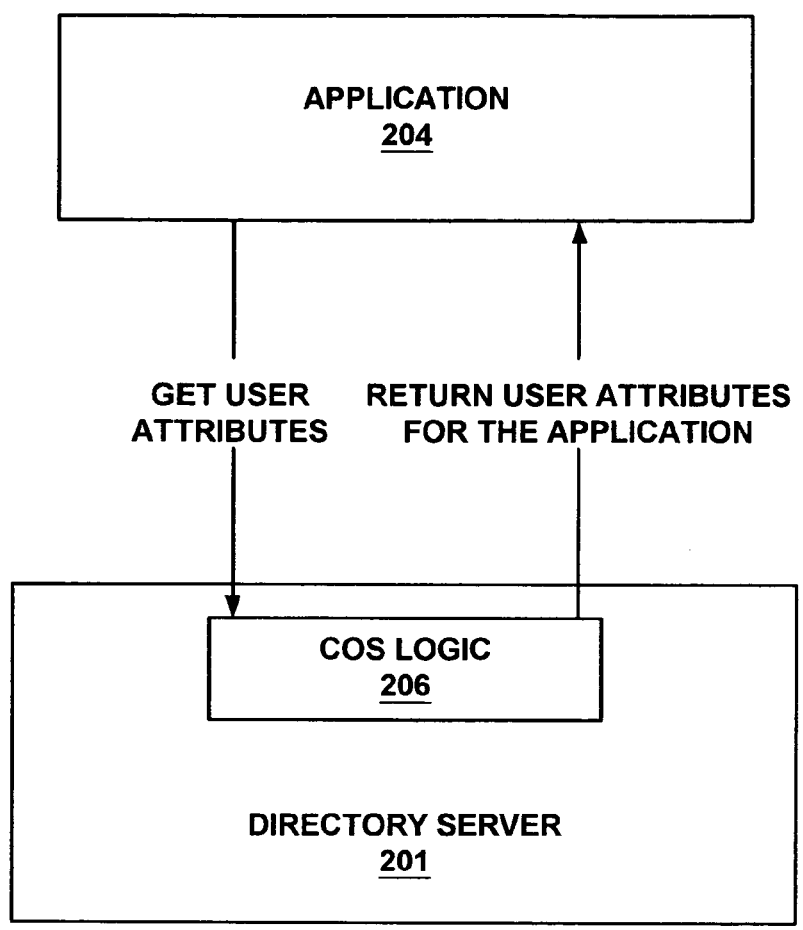
FIG. 2 is a block diagram illustrating the reduction of directory calls used to retrieve user attributes with the CoS feature.

FIG. 2 is a block diagram illustrating the reduction of directory calls needed to acquire user attributes for an application. In this example, the application 204 only needs to make one directory call to retrieve service attributes for a particular user. The reason for the reduction in the number of directory calls is because the CoS logic 206 in the directory server 201 does the job of determining the service attributes applicable to the user, the instead of the application performing the work. As a result, the number of directory calls made by the application are reduced to one call. Thus, utilizing the CoS logic 206 of the Directory Server would not only reduce the amount of data storage necessary to associate multiple service attributes to users, but also reduces traffic on the network.

Directory server clients read attributes stored in user entries. A user entry typically contains attributes that describe the user's basic information such as name, department, phone number, etc. An entry can also contain a number of related service attributes. For example, a user entry might include a number of attributes that describe the hosting services provided to the individual. Suppose a company provides its customers with the tools to create their own home pages. The home page is the first page the user sees when they log into the company's internet service. The customer can configure the page to display information such as local news, stock quotes, and links to other sites that may be of special interest. The customer can also choose from four service plans related to level of service desired. When a customer signs up for a particular service plan, an administrator assigns the appropriate class of service to the user's role that is associated to the user's account.

Figure 3:
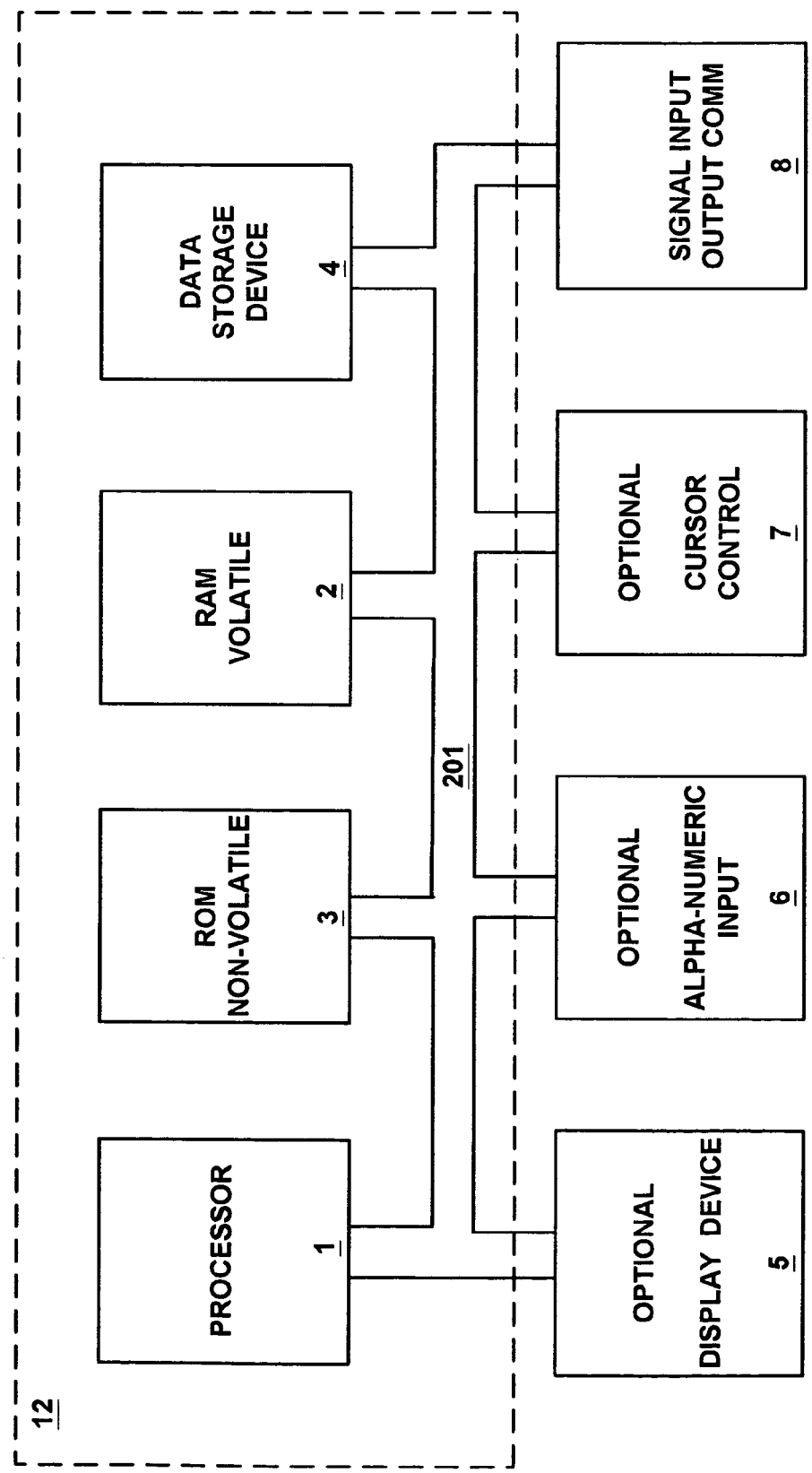
FIG. 3 is a logical block diagram of circuitry located within the exemplary directory server computer system of FIG. 2.

Referring now to FIG. 3, a block diagram of exemplary directory server computer system 201 is shown. Computer system 201 includes an address/data bus 12 for communicating information, a central processor 1 coupled with bus 12 for processing information and instructions, a volatile memory unit 2 (e.g., random access memory, static RAM, dynamic RAM, etc.) coupled with bus 12 for storing information and instructions for central processor 1 and a non-volatile memory unit 3 (e.g., read only memory, programmable ROM, flash memory, EPROM, EEPROM, etc.) coupled with bus 12 for storing static information and instructions for processor 1. As described above, computer system 201 also contains a display device 5 coupled to bus 12 for displaying information to the computer user. Moreover, computer system 201 also includes a data storage device 4 (e.g., memory stick) for storing information and instructions.

Also included in computer system 201 of FIG. 3 is an optional alphanumeric input device 6 which, in one implementation, is a handwriting recognition pad ("digitizer"). Device 6 can communicate information and command selections to central processor 1. Computer system 201 also includes an optional cursor control or directing device 7 coupled to bus 12 for communicating user input information and command selections to central processor 1. Computer system 201 also includes signal communication interface 8, which is also coupled to bus 12, and can be a serial port. Communication interface 8 can also include number of wireless communication mechanisms such as infrared or a Bluetooth protocol.

It is appreciated that computer system 201 described herein illustrates an exemplary configuration of an operational platform upon which embodiments of the present invention can be implemented. Nevertheless, other computer systems with differing configurations can also be used in place of computer system 201 within the scope of the present invention.

Figure 4:
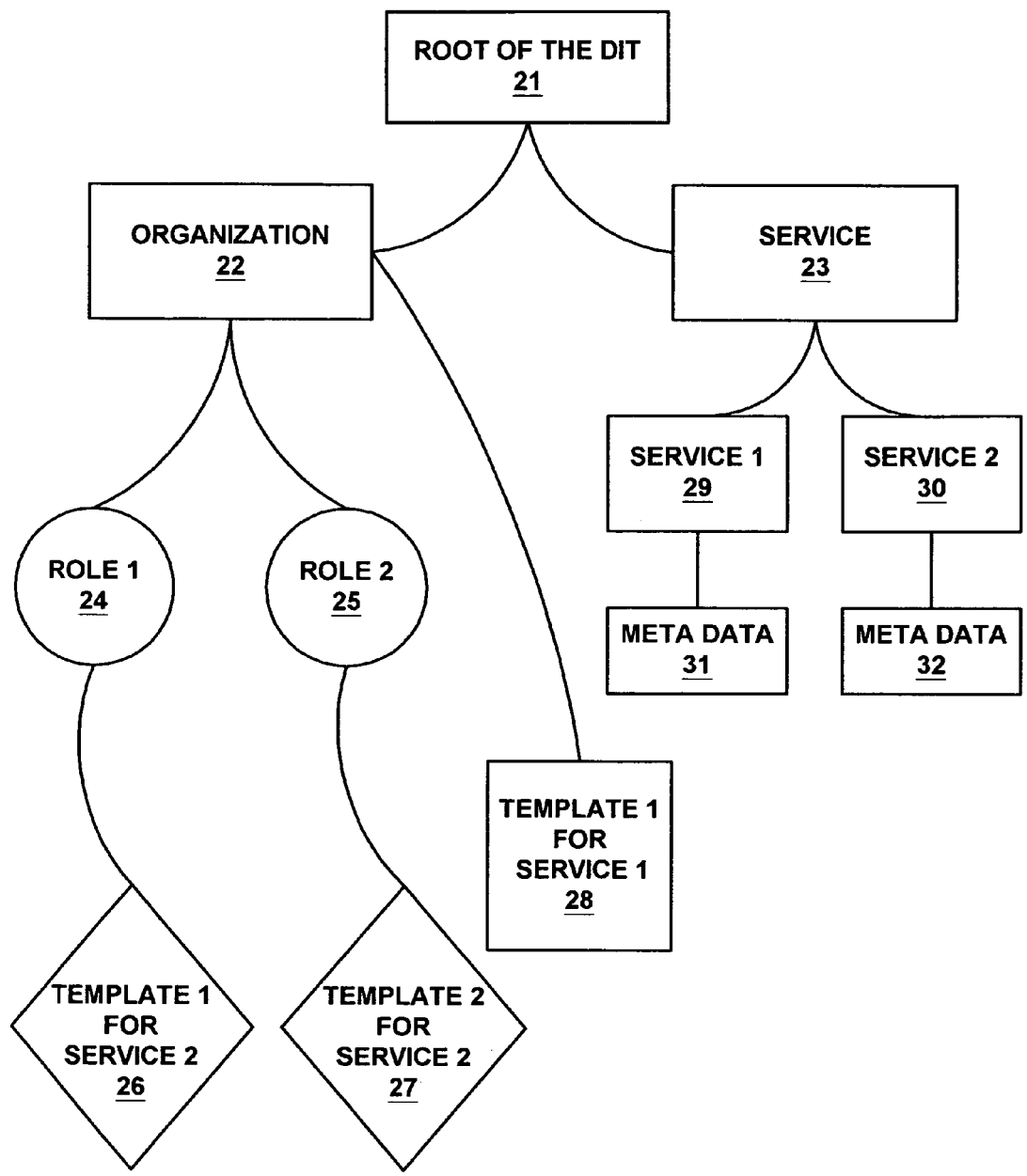
FIG. 4 is an illustration of the using the templates to share information per role and organization in a directory server.

FIG. 4 is an illustration of how service templates can be associated with roles and organizations in a directory server DIT. As described above, CoS logic uses service templates assigned to particular users, based on their roles to report the service attributes for a particular user. In this example, we observe that the root of the DIT 21 has two branches, organization 22 and service 23. Associated to organization 22 is a first role one 24 and a second role two 25. In addition, a service template one for service one 28 is associated to the organization 22. Also included is template one for service two 26 and template two for service two 27 which are associated with roles 24 & 25. On the other side of the root of the DIT 21, associated to the service 23 is service one 29 and service two 30. Also included is meta data 31 and meta data 32. The meta data is used to determine all the user attributes that are required to be defined for the particular service/application.

A user can be assigned to a particular role or a particular organization therefore inheriting the user attributes associated to the role or the organization. For example, if a user were assigned to role one 24, and was using service one 29, the user would inherit the user attributes assigned by template one for service one 28.

FIG. 5 is an example of a service template 100. The service template 100 can include attributes such as the cost of the service 101, amount of storage space 102, access to web mail 103, and access to calendaring 104. With the class of service feature, users assigned to a particular class of service 99 will automatically inherit the specific attributes for each of these classes. Once the class of service 99 has been created, storing four different attributes per user is no longer necessary. With the use of the class of service feature, a CoS attribute 99 can be stored that contains one of the following values: Premium 105, Deluxe 106, Promotional 107, or Basic 108. For example, a user with the CoS 99 attribute Premium 105 has a cost 101 of $30 per month, a storage limit 102 of 30 MB, access to web mail 103 and access to the calendar service 104. Instead of storing four different attributes for each user entry, a template to the class of service can be associated to a user using a default organization CoS template or a role CoS template. Each template will hold values for each of the 4 attributes associated with a particular class of service. In addition, if the user decides that 20 MB of web space is sufficient, the class of service 99 can be changed from Premium 105 to Deluxe 106 by associating the user to role which holds that privilege.

The CoS logic in the directory server generates the user attributes and are sent to the application and the values returned for these attributes are determined by the user's distinguished name (DN), and the templates that get associated with the user depending on his roles. A Class of Service (CoS) allows attributes to be shared between entries in a way that is invisible to applications. With the CoS feature, some attribute values may not be stored within the user entry itself. Instead, user attributes can be generated by the Class of Service logic as the entry is sent to the client application.

Figure 6:
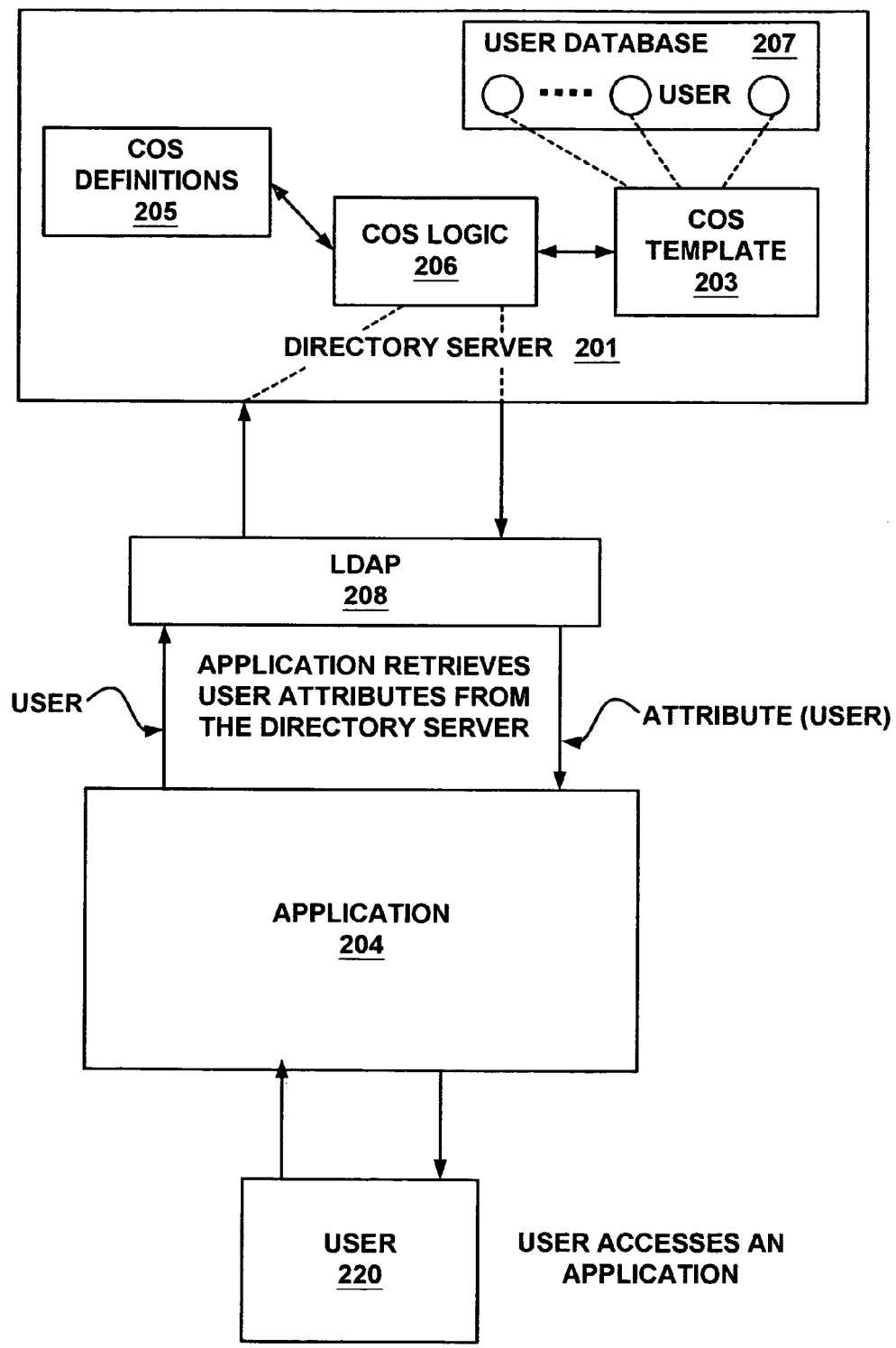
FIG. 6 is a logical block diagram of how the CoS logic determines the application specific user attributes form the CoS templates using CoS definitions.

FIG. 6 is a logical block diagram 200 of a directory server 201 using the CoS logic 206 to return user attributes to an application 204. When a user 220 accesses an application 204, the application must retrieve the required attribute values to provide the correct service level for the user. Traditionally, the application would need to make numerous directory calls to retrieve all the required attribute values for the user and associate him with the right attribute values based on his service level. In contrast, in FIG. 6, the CoS feature allows an application to retrieve all of the user's applicable service attributes with one directory call.

After the application 204 makes a directory call for the user's service attributes, the CoS logic 206 determines the attributes to be sent to the application. The directory server 201 uses the CoS logic 206, CoS definitions 205, CoS service templates 203, and a user database 207. When the application 204 makes a directory call to the directory server 201, the user's identity is sent. The identity might be a login name, or another attribute used to distinguish the user from other users on the network. When the application 204 makes the initial directory call to receive the user attributes for a particular application, based on role and organization, the CoS logic 206 picks up the attribute values from the right CoS template. When the directory server 201 retrieves the user identity, the identity is used to determine the service attributes for that user.

FIG. 7 is an example of a service template 300 for assigning two different classes of service to two different organizations. In this particular case, the four different classes of service are premium 105, deluxe 106, promotional 107, and basic 108. The two different organizations are organization one 250 and organization 2 270. In this case, organization one has a service level of premium 105 and organization two has a service level of deluxe 106. By assigning an organization a particular service level, the attributes assigned to the service level are inherited by all of the users beloging to the organization. Referring back to FIG. 5, the premium class of service 106 has a cost attribute 101 of $30/mo, a storage attribute 102 of 30 Mb, the use of web-mail 103, and the use of the calendar service 104. If a user is assigned to organization one, the user will inherit the attributes of the premium service level. Likewise, the users assigned to organization two will inherit the service attributes of the deluxe package.

Figure 8:
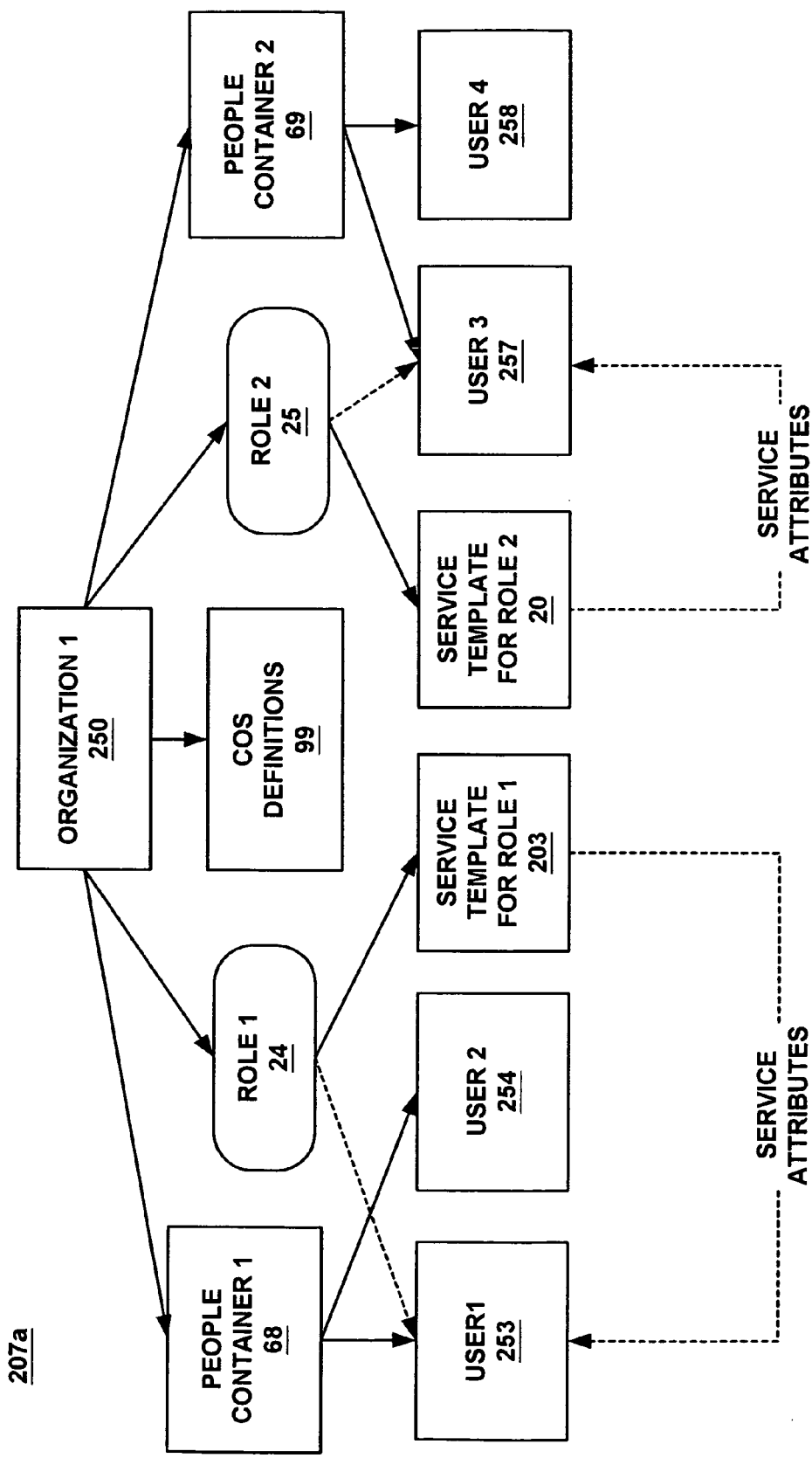
FIG. 8 is a logical block diagram of the classification of users under organization one.

FIG. 8 is a logical block diagram 207a of the classification of users under organization one. In this figure, users are associated with an organization and a people container in addition, a user is associated with a particular role. For example, user one 253 is associated to organization one 250 and role one 24. On the other hand, user three 257 is associated with organization one 250 and role two 25. Even though the two users are associated with the same organization, their service attributes can be different. The service attributes for role one 24 can be different than the service attributes for role two 25. The user associated with role one 24 is users one 253. The users associated with role one 24 and organization one 250 will have the same user attributes assigned to them. When an application makes a call to the directory server for the user attributes of any of the users belonging to role one 24, the same user attributes will be returned. Likewise, the different users under role two 252 and organization one 250 all share the same user attributes. The Cos template 99 is associated defines the service attributes values for all other default users who are not assigned to any other roles, for example user 2 254 and user 4 258.

FIG. 9 is an example of a service template 400 for two different roles in organization one 250. As described above, service attributes for a user can be assigned according to the organization the user is assigned to. In addition to different service attributes for various organizations, there can be different service levels assigned to users within a particular organization. To accomplish this, a user is associated with a role in addition to an organization. For example, role one 24 is assigned a service level of deluxe 106 and role two 25 is assigned a service level of premium.

An administrator can change the service level for all of the users associated to role one 24 and organization one 250 without changing the entries for all of the users associated with role one and organization one. This can be easily accomplished by changing the service template 400. When the service attributes are changed in the service template, all of the users will inherit the changed attributes. For example, if the service level for role two 25 was changed from premium 105 to deluxe 106, all of the users classified under organization one and associated to role two would have the service level of deluxe 106.

FIG. 10 is an example of a service template 500 for two different roles associated with organization two 270. The service template 500 assigns user attributes to the different roles associated with organization two 270. For example, the users that have a role of one 251 and an organization of two 270 share the user attributes of the deluxe 106 class of service 99. In addition, the users with a role of three 271 and an organization of two 270 share the user attributes of the basic 108 class of service 99.

As a result of classifying users under two different user categories, there are conflicts in the user attributes assigned to a user. A user will usually be associated with a particular organization and a particular role. It is possible for the service attributes of a role to be different than the service attributes of an organization. For example, the users associated to role three 271 have a service level of basic 108 but the user is also under organization two 270 that has a service level of deluxe 106. It is therefore necessary to have service priority that defines the priority given to the different categories a user can be associated with.

Figure 11:
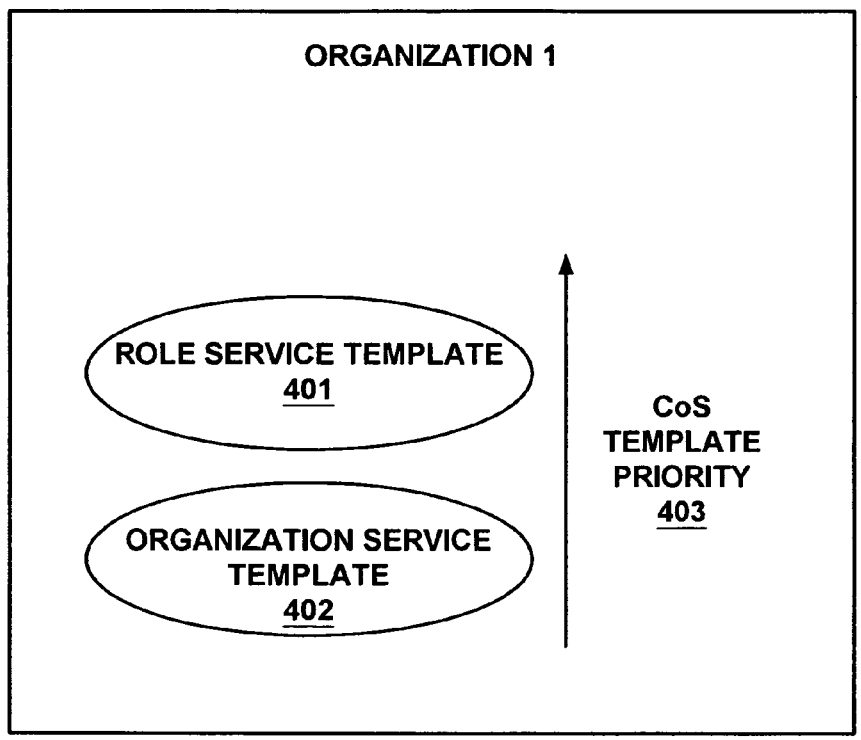
FIG. 11 is an example of a CoS Template priority used to determine the service template that becomes applicable to user under a particular role and for a given organization.

FIG. 11 is an example of where CoS logic uses template priority 600 used to determine the template that needs to be used to pick up the service attributes. In this example, the role service template attributes take precedence over the organization service template attributes. The attribute priority 403 can be assigned to each and every service template that is created. As stated above, the users associated to role three 271 have a service level of basic 108 but the user is also associated to organization two 270 that has a service level of deluxe 106. Since the service attributes of the role take priority over the attributes of the organization, the users would inherit the service attributes of the basic service level.

Figure 12:
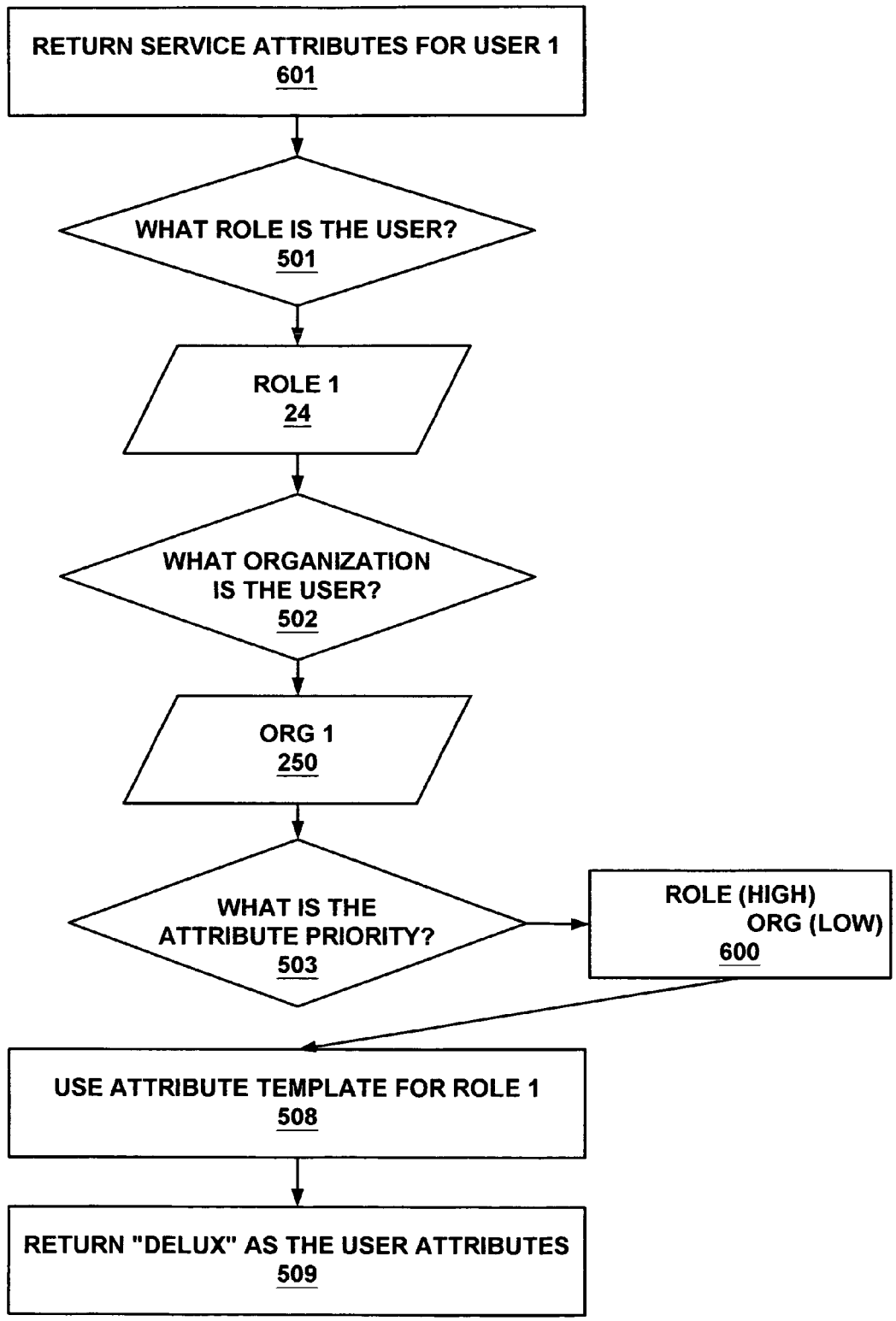
FIG. 12 is an example of the process the CoS logic uses to determine the service attributes for user 1.

FIG. 12 is a computer implemented flow diagram of an example of the process 800 the CoS logic uses to determine the default attribute for user one 253 from FIG. 8. As described above, the purpose of the CoS logic is to determine the service level for the user and return the service attributes associated with the service level 601. The first step is to determine the role associated to user one 253. The next step is to determine the organization of user one 253. The CoS logic calls up the user database 207 from FIG. 6 and finds that user one 253 is associated with role one 24 of organization one 250. The service level for the users in role one 24 of organization one 250 is deluxe 106 (FIG. 9) and the service level for the users of organization one 250 is premium 105 (FIG. 7). Since the service levels are different for the two groups, the CoS logic must use a priority associated with the service template 600 to determine the service level of user one 253. The CoS template priority 403 (FIG. 11) tells the CoS logic that the role attributes are a higher priority than the organization attributes. The CoS logic uses the priority restraints to conclude that user one 253 inherits the service attributes of the deluxe service level 106. The attributes are retrieved from the service template 100 (FIG. 5) that is stored as CoS templates in directory server 201 (FIG. 6).

Figure 13:
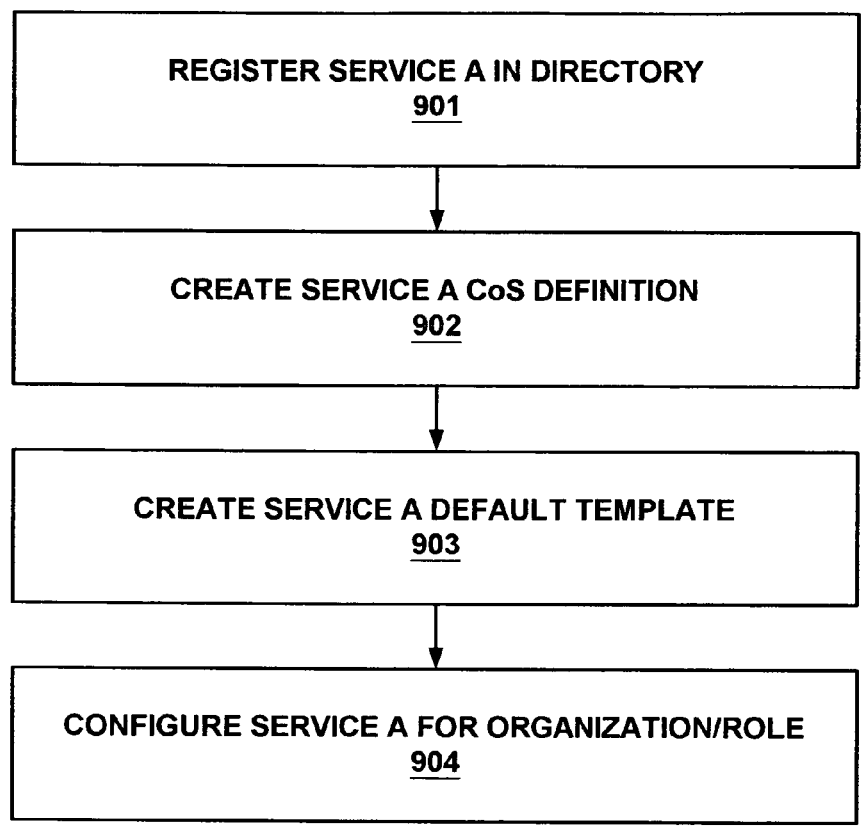
FIG. 13 is a flow diagram of the process used to register a service in a directory server incorporating embodiments of the present invention.

FIG. 13 is a flow chart illustrating the computer controlled process of configuring a service to use the CoS feature for an organization. When a new service is to be added to the directory server, the first step is to register the service 901. In this example, the service is called service A. Then the next step is to create a service A CoS definition 902 that includes the different components that define the service. Referring back to FIG. 5, the CoS definitions are cost 101, storage 102, web-mail 103, and calendar 104.

The next step is to create a service template 903. The service template defines the class of service provided to particular users associated with particular roles or organizations. Different service templates can be created for different levels of service and each of these templates can be assoicated an organization or role. In FIG. 5, there are four different levels of service and the CoS template defines the attributes values for each class of service. The CoS template also defines the CoS priority as described in FIG. 11. Referring back to FIG. 7, table 300 represents a CoS service template for two different organizations. In this service template, organization one 250 has a service class of premium 105 and organization two 270 has a service class of deluxe 106. By creating multiple service templates, it is possible to provide a customized level of service even though the attributes of the users are defined by the templates. The cos template priority can be used when conflicting service levels are encountered.

The last step is to configure the service for an organization. By configuring the service at an organizational level, it is possible to provide different levels of service to users that belong to the same organization. Referring back to FIG. 8 which illustrates how a service is configured for organization one 250. In this example, the organization is associated to roles one 24 and two 25. Since the organization was configured, the service level for all users in organization one would be premium 105 (FIG. 7) unless they are over riden with higher priority role service template. The service template for the organization in combination with the cost priority the users associated to role one 24 in organization one 250 to the deluxe service level. A customized level of service is established by creating multiple service templates.

Figure 14:
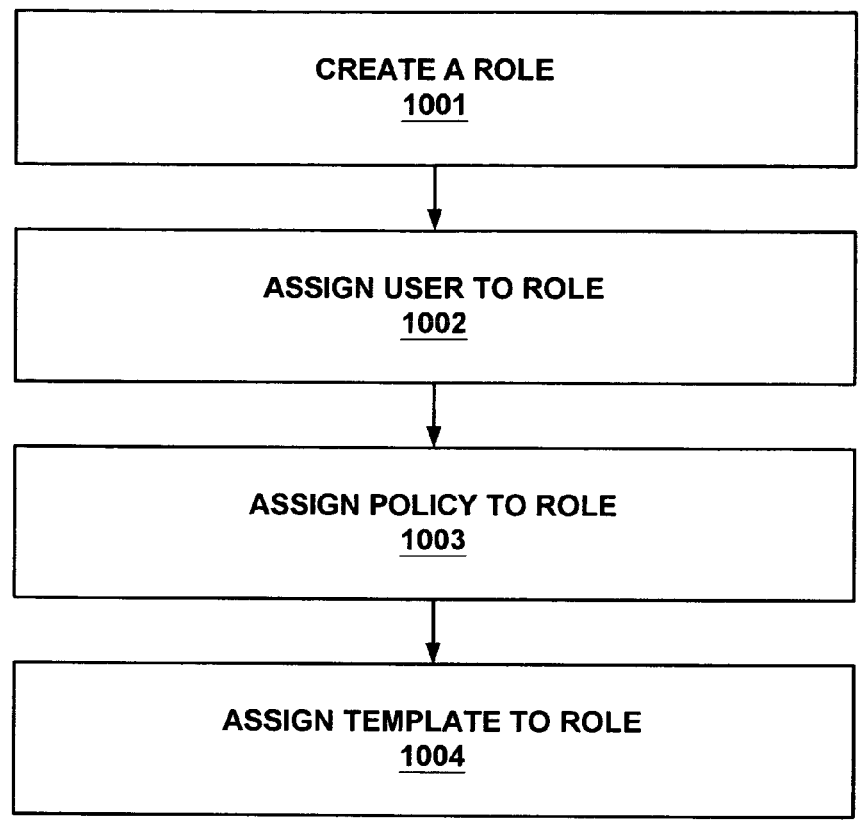
FIG. 14 is a flow diagram of the process used to assign users to roles in a directory server incorporating embodiments of the present invention.

FIG. 14 is a flow diagram 1000 of the process of assigning user policies to roles. The first step would be to create a customized role. Then the user can be assigned to a role. A role can be associated with policies by assigning a role with policies. Step 1003 is to assign the policy to the role. The policy templates can include the cos priority as described above in FIG. 11. Referring back to FIG. 9, service template 400 defines service levels for role one 24 and role two 25.

Embodiments of the present invention, a method and system for implementing policies, resources, and privileges for using services in LDAP, have been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing an application with a service attribute associated with a user, comprising:
   receiving a request from the application for the service attribute associated with the user;
   obtaining a role service level for a role associated with the user using a role service level template;
   obtaining an organization service level for an organization associated with the user using an organization service level template;
   determining whether the organization service level and the role service level match; and
   if the role service level and the organization service level do not match:
      determining a priority of the organization service level and a priority of the role service level using a priority template, wherein the priority template is configured to store priority information associated with the role service level and the organization service level;
      providing the service attribute associated with the organization service level, if the priority of the organization service level is higher than the priority of the role service level; and
      providing the service attribute associated with the role service level, if the priority of the role service level is higher than the priority of the organization service level;
   if the role service level and the organization service level match:
      providing the service attribute using one selected from the group consisting of the role service level and the organization service level.

2. The method of claim 1, wherein the role is associated with the organization.

3. The method of claim 1, wherein the service attribute comprises at least one selected from the group consisting of cost, an amount of storage space, an access to web mail, and an access to calendaring.

4. The method of claim 1, wherein providing the service attribute from the role service level comprises obtaining the service attribute from a class of service template.

5. The method of claim 4, wherein the class of service template comprises a premium service level, a deluxe service level, a promotional service level, and a basic service level.

6. The method of claim 1, wherein providing the service attribute from the organization service level comprises obtaining the service attribute from a class of service template.

7. The method of claim 6, wherein the class of service template comprises a premium service level, a deluxe service level, a promotional service level, and a basic service level.

8. A system, comprising:
- an organization service template configured to store a plurality of organization service levels and a role service template configured to store a plurality of role service levels, wherein each of the plurality of role service levels and each of the plurality of organization service levels is associated with a class of service;
- a class of service template configured to store a plurality of class of service levels, wherein each of the plurality of class of service levels comprises a service attribute; and
- a directory server comprising a hierarchical data store associating a user with an organization and a role, wherein the directory server comprises class of service logic configured to determine the service attribute associated with the user using the class of service template, the organization service template, and the role service template.

9. The system of claim 8, further comprising:
- a priority template configured to store priority information associated with each of the plurality of role service levels and each of the plurality of organization service levels.

10. The system of claim 9, wherein the class of service logic uses the priority template to determine whether the plurality of the role service levels or the plurality of the organization service level has a higher priority, if the role service level and the organization service level are different.

11. The system of claim 10, wherein the service attribute associated with one of the plurality of the role service levels is provided to an application, if the priority of the plurality of role service levels is higher than the priority of the plurality of organization service levels.

12. The system of claim 10, wherein the service attribute associated with one of the plurality of organization service levels is provided to an application, if the priority of the plurality of organization service levels is higher than the priority of the plurality of the role service levels.

13. The system of claim 8, further comprising:
- an application configured to request the service attribute associated with the user.

14. The system of claim 8, wherein the directory server is used for a portal application.

15. The system of claim 8, wherein the service attribute comprises at least one selected from the group consisting of a cost of a service, an amount of storage space, an access to web mail, and an access to calendaring.

16. The system of claim 8, wherein the class of service levels comprise a premium service level, a deluxe service level, a promotional service level, and a basic service level.

17. A computer system, comprising:
- a processor;
- a memory;
- a storage device; and
- software instructions stored in the memory for enabling the computer system under control of the processor, to:
  - receive a request from the application for the service attribute associated with the user;
  - obtain a role service level for a role associated with the user using a role service level template;
  - obtain an organization service level for an organization associated with the user using an organization service level template;
  - determine whether the organization service level and the role service level match; and
  - if the role service level and the organization service level do not match:
    - determine a priority of the organization service level and a priority of the role service level using a priority template, wherein the priority template is configured to store priority information associated the role service level and the organization service level;
    - provide the service attribute associated with the organization service level, if the priority of the organization service level is higher than the priority of the role service level; and
    - provide the service attribute associated with the role service level, if the priority of the role service level is higher than the priority of the organization service level;
  - if the role service level and the organization service level match:
    - provide the service attribute using one selected from the group consisting of the role service level and the organization service level.

* * * * *

UNITED STATES PATENT AND TRADEMARK OFFICE
CERTIFICATE OF CORRECTION

PATENT NO. : 7,031,967 B2
APPLICATION NO. : 10/118885
DATED : April 18, 2006
INVENTOR(S) : Qingwen Cheng et al.

It is certified that error appears in the above-identified patent and that said Letters Patent is hereby corrected as shown below:

On Title Page Item (75) Col. 1 should read

Under Prior Publication Data, Applicant respectfully requests

--US-2005-0171958-A9  08/04/2005-- be added to the cover page.

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,031,967 B2 |
| APPLICATION NO. | : 10/118885 |
| DATED | : April 18, 2006 |
| INVENTOR(S) | : Qingwen Cheng et al. |

It is certified that error appears in the above-identified patent and that said Letters Patent is hereby corrected as shown below:

On the Title Page Item (65):

Under Prior Publication Data, (65), the publication data was not listed.

Applicant respectfully requests --US-2005-0171958-A9  08/04/2005-- be added to the cover page.

Signed and Sealed this

Twelfth Day of February, 2008

JON W. DUDAS
*Director of the United States Patent and Trademark Office*